July 20, 1965
P. W. FREUND ETAL
3,196,238
APPARATUS FOR CONNECTING ELECTRICAL UNITS TO A TEST CIRCUIT
Filed July 3, 1963
2 Sheets-Sheet 1
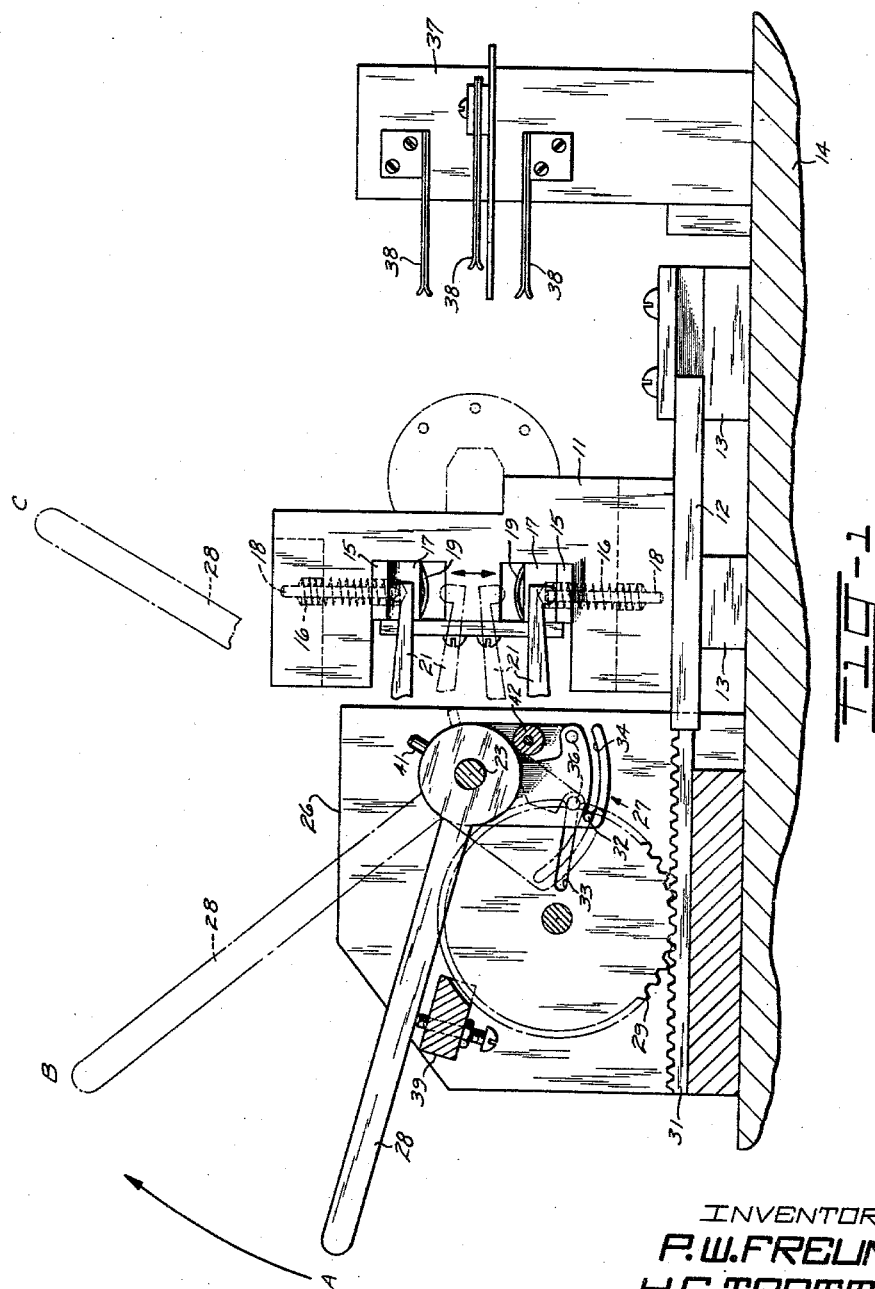
INVENTORS
P.W. FREUND
H.C. TROTMAN
BY
ATTORNEY

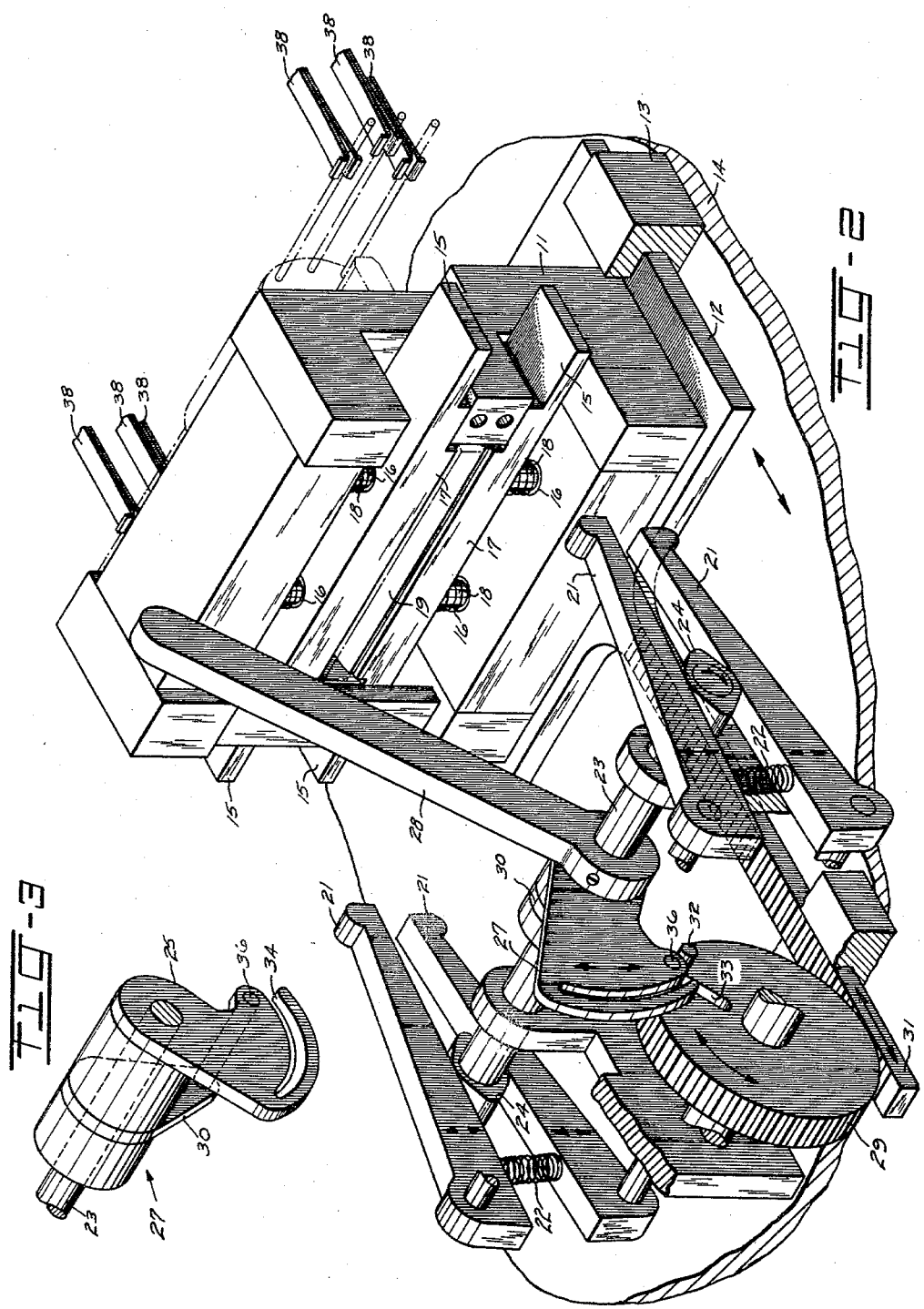

United States Patent Office 3,196,238
Patented July 20, 1965

3,196,238
APPARATUS FOR CONNECTING ELECTRICAL UNITS TO A TEST CIRCUIT
Paul W. Freund, Irvington, and Harold C. Trotman, Westfield, N.J., assignors to Western Electric Company, Incorporated, New York, N.Y., a corporation of New York
Filed July 3, 1963, Ser. No. 292,671
5 Claims. (Cl. 200—153)

This invention relates in general to an apparatus for connecting electrical units to a test circuit and, more particularly, to such as apparatus for accurately and rapidly connecting electrical units to a test circuit with uniform contact pressure.

With certain electrical units, as for example a transformer used in a submarine cable repeater, high performance standards are essential. One important electrical parameter which can affect the performance of a transformer is the various capacitances associated with the windings thereof. In order to determine whether or not a transformer has acceptable values of capacitance, test circuit measurements are required. When precise measurements are required, each transformer tested should be consistently positioned relative to and connected with uniform pressure against the contacts of the electrical measuring circuit. If such precautions are not taken, i.e., if some transformers are connected or are held differently than others, as would occur in a manual operation, the measured reading obtained may not be indicative of the transformer's true value or values of capacitance.

For these reasons, an apparatus is needed for rapidly measuring the capacitance of transformers and the like, and which can be operated by different and unskilled workers without affecting the desired manner in which successive electrical connections are made to the test circuit.

Accordingly, one object of this invention is to provide an apparatus for accurately and rapidly connecting electrical units to a test circuit.

Another object is to provide an apparatus for connecting electrical units to a test circuit wherein the electrical units are connected with uniform pressure to the contacts of the test circuit.

According to these and other objects of the invention, a slidable carriage supports a pair of spring-biased jaws. The initial movement of a hand lever closes these jaws with a predetermined pressure about the core of the transformer under test. Continued movement of the handle slides the carriage on which the jaws are mounted to a position at which the transformer terminals are connected to the contacts or conductive prongs of a test circuit.

In accordance with the invention, a double-section cam has a driving section which transmits motion to the carriage through a driving gear, and has a locking section to prevent movement of the driven gear at times when the same lever is performing other operations.

Stops are provided on the lever so that the transformer leads cannot be forced into the test prongs with excessive pressure, regardless of the manner in which the operator moves the handle. Also, since the body of the transformer is electrically contacted and supported by the jaws in accordance with the pressure exerted by the jaw springs, the resultant force applied by the jaws against the unit is similarly beyond the control of the operator.

The apparatus as embodied herein thus assures accurate gripping of the transformer core and locks the slide in a fixed position during testing to achieve the degree of reliability required for testing high performance transformers, and the like.

Other objects, features and advantages will become more apparent from the following detailed description when considered in conjunction with the accompanying drawings, wherein:

FIG. 1 is a side elevation of the apparatus showing the handle in its initial position and after approximately 30° of travel;

FIG. 2 is an isometric view of the apparatus showing the slidable carriage with the leads of the electrical unit to be measured connected to conductive prongs of the test circuit; and FIG. 3 is an isometric view of the cam assembly.

Referring now to the drawings and more particularly to FIG. 1 thereof, there is shown a carriage 11 mounted on a slide 12 which is guided along a linear path by supports 13 secured to the base 14. Horizontally disposed within the carriage is a pair of jaws 17 with mutually opposed concave surfaces 19. These jaws are biased toward each other by two vertically disposed pairs of springs 16. Separate guide rods 18 affixed to the carriage are used to support the respective springs 16. A different pair of spring-biased levers 21 are in slidable contact with each of the mutually opposed and protruding end sections 15 of the jaws 17, best seen in FIG. 2. A different spring 22 serves to pull each pair of levers 21 together.

Mounted on a common shaft 23 are a pair of cams 24, each positioned intermediate a different pair of the levers 21. The shaft 23 is journaled within a frame 26 mounted on the base 14.

In accordance with one aspect of the invention, the jaws 17 are opened and closed upon the electrical unit being measured with uniform pressure and are moved a precise, horizontal distance to a terminal mount 37 by means of a unique double section cam assembly 27 which drives a rack 31 and gear 29 associated with the carriage 11.

Considered more specifically, the cam assembly together with an operating handle 28 are mounted on the shaft 23. As best seen in FIG. 3, the cam assembly includes a cam plate 25 which has a slot 34 therein. A pin 36, oriented parallel to the shaft 23, is supported at one end by the cam plate 25 and at the other end by a tapered member 30 which is also affixed to the shaft 23. The gear 29, journaled within the frame 26, operates in conjunction with the rack 31. A pin 32 and a slot 33 are located on the gear 29. The relationship and functions of the various slots and pins associated with the cam assembly 27 and gear 29 will be described in greater detail in connection with a discussion of the mode of operation of the apparatus hereinbelow.

Secured to the base 14 is a terminal mounting fixture 37 for supporting conductive prongs 38. As shown in FIG. 1, an adjustable stop 39 prevents travel of the handle 28 below its initial position A and a pin 41 secured to the hub of the handle 28 prevents travel of the handle beyond its opposite extreme position C by striking stop 42.

To operate, the handle 28 is placed in position A so that it rests against the stop 39. When in this position, the carriage 11 is completely retracted from the fixed mounting fixture 37. Also at the initial position A, the gear pin 32 is located at the innermost and closed end of slot 34 of the cam plate 25 (FIG. 3). Approximately 30° of upward angular movement places the handle 28 at position B. During the movement of the handle 28 through this sector, the pair of cams 24 are rotated sufficiently to permit both pairs of levers 21 to close by the force exerted thereon by the springs 22. This, in turn, permits the jaws 17 to move together by the force of the springs 16 exerted thereon so as to press against the body of the electrical unit (shown in phantom lines in FIGS. 1 and 2) being tested. The jaws 17 thus both physically hold the unit and electrically contact the unit's body. Throughout the entire sector A–B of movement of the handle 28, the gear pin 32 remains within the cam plate slot 34, thereby preventing any rotational movement of the gear 29.

Once the handle 28 is moved upwardly beyond position B, the cam pin 36, best seen in FIG. 3, enters the gear slot 33 and the gear pin 32 simultaneously leaves the cam slot 34. In this way, the gear 29 is unlocked to permit the pin 36 in sliding association with the slot 33 to rotate the gear 29 and drive the rack 31. Movement of the rack 31 slides the carriage 11 forward so that the leads of successive electrical units connect the conductive prongs 38 monuted on the test fixture at the same points and with the same force exerted thereagainst. Movement of the carriage 11 also results in the jaws 17 withdrawing from the levers 21. This permits the pair of cams 24 to rotate without effecting the closed position of the jaws. Approximately 75° of angular movement of the handle 28 is required between position B, where the jaws are closed, and position C where the carriage has been moved adjacent the conductive prongs 38.

At the conclusion of an electrical test, the handle 28 is pulled backwards from position C towards position A. Such movement initially slides the carriage 11 away from the conductive prongs 38 and subsequently causes the jaws 17 to open. This permits the tested electrical unit to be removed and a new one inserted for a subsequent test.

It is to be understood that the above described embodiment is simply illustrative of the application of the principles of the invention. Numerous other arrangements may be readily devised by those skilled in the art which will embody the principles of this invention and fall within the spirit and scope thereof.

What is claimed is:

1. An apparatus for connecting a succession of electrical units to a circuit rapidly and with consistent contact pressure, comprising:
    a supporting base,
    a slidable carriage mounted on said supporting base,
    a pair of jaws mounted on said slidable carriage for holding the body of an electrical unit,
    means mounted on said base for supporting a plurality of conductive prongs in predetermined spaced relation to coincide with and contact the respective leads of the electrical unit held by the pair of jaws as the slidable carriage reaches a predetermined position adjacent the conductive prongs,
    single-motion actuating means for initially opening and closing said jaws while maintaining the slidable carriage locked in a fixed position and for subsequently sliding said carriage to said predetermined position adjacent the electrical prongs while maintaining said jaws in a closed position against said electrical unit with uniform pressure, and
    stop means to determine the contact pressure between leads of the electrical unit and the conductive prongs.

2. An apparatus according to claim 1 wherein said single motion actuating means includes:
    a rotatable shaft,
    a handle mounted on the shaft,
    a cam assembly mounted on the shaft, said cam assembly having a pin mounted thereon and a slot located therein,
    a rack for actuating said slidable carriage, and
    a gear with a slot therein for driving said rack, said cam assembly pin slidably engaging the slot of said gear during one portion of arcuate movement of said handle to prevent rotation of said gear, and said gear having a pin mounted thereon which slidably engages the cam assembly slot to actuate said gear during a separate portion of arcuate movement of said handle.

3. An apparatus for connecting a transformer to a test circuit with a single movement of a handle comprising:
    a supporting base,
    a slidable carriage mounted on said base,
    a pair of movable jaws mounted on said slidable carriage for holding the transformer and electrically contacting the core of the transformer,
    spring means for normally biasing said jaws toward each other,
    a fixed mounting in the path of movement of the slidable carriage,
    conductive prongs fastened to said fixed mounting to receive the respective leads of the transformer held by the spring-loaded jaws as the slidable carriage moves toward the fixed mounting,
    spring-biased lever means for actuating said jaws,
    a shaft rotatably positioned on said base,
    a handle mounted on said shaft,
    cam means affixed to said shaft for simultaneously actuating the lever means,
    a rack slidably guided on said base for driving said carriage,
    a gear rotatably mounted on said base for driving said rack,
    a cam assmbly mounted on said shaft to lock the gear during one sector of movement of the handle while the cam means rotates to actuate the jaws, and to actuate the slidable carriage through the rack and gear during another sector of movement of the handle to connect the leads of the transformers to conductive prongs, and
    stop means to determine the contact pressure applied by said handle between the leads of the electrical unit and the conductive prongs.

4. An apparatus according to claim 3 wherein:
    the cam assembly includes a pin mounted thereon and a slot located therein wherein,
    the gear includes a slot therein for driving said rack, said cam assembly pin slidably engaging the slot of said gear during one portion of arcuate movement of said handle to prevent rotation of said gear, and wherein,
    said gear includes a pin mounted thereon which slidably engages the cam assembly slot to actuate said gear during a separate portion of arcuate movement of said handle.

5. A handle-operated locking and driving mechanism comprising:
    a supporting base,
    a rotatable shaft positioned on said supporting base,
    a handle mounted on said shaft,
    a cam assembly mounted on said shaft, said cam assembly having a pin mounted thereon and a slot located therein,
    a rack mounted on said base for driving any desired movable apparatus connected thereto, and
    a gear with a slot therein for driving said rack, said cam assembly pin slidably engaging the slot of said gear during one portion of arcuate movement of said handle to prevent movement of said gear, said gear further having a pin mounted thereon which slidably engages the cam assembly slot to actuate said gear during another portion of arcuate movement of said handle.

No references cited.

ROBERT K. SCHAEFER, *Acting Primary Examiner.*